US012345428B2

(12) United States Patent
Mowris et al.

(10) Patent No.: US 12,345,428 B2
(45) Date of Patent: *Jul. 1, 2025

(54) OCCUPANCY FAN CONTROLLER

(71) Applicants: Robert J. Mowris, Olympic Valley, CA (US); James Lau, Tustin, CA (US)

(72) Inventors: Robert J. Mowris, Olympic Valley, CA (US); John Walsh, Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/809,050

(22) Filed: Aug. 19, 2024

(65) Prior Publication Data

US 2024/0410606 A1 Dec. 12, 2024

Related U.S. Application Data

(63) Continuation-in-part of application No. 18/419,407, filed on Jan. 22, 2024, now Pat. No. 12,066,200, (Continued)

(51) Int. Cl.
*F24F 11/00* (2018.01)
*F24F 11/46* (2018.01)
(Continued)

(52) U.S. Cl.
CPC ............ *F24F 11/46* (2018.01); *F24F 11/52* (2018.01); *F24F 11/77* (2018.01); *F24F 2110/10* (2018.01); *F24F 2120/10* (2018.01)

(58) Field of Classification Search
None
See application file for complete search history.

(56) References Cited

U.S. PATENT DOCUMENTS 2,655,645 A 10/1953 Bagno
5,881,806 A * 3/1999 Rudd .................. F24F 3/14
165/250

(Continued)

FOREIGN PATENT DOCUMENTS

EP 2906880 5/2018

OTHER PUBLICATIONS

California Public Utilities Commission, Impact Evaluation of 2013-14 Commercial Quality Maintenance Programs (HVAC3), DNV GL, Apr. 2016, San Francisco, CA.
(Continued)

*Primary Examiner* — Paul B Yanchus, III
(74) *Attorney, Agent, or Firm* — CIONCA IP Law P.C.

(57) ABSTRACT

An occupancy fan controller method to detect a Heating, Ventilating Air Conditioning (HVAC) fan is operating based on a fan-on duration control selected by a user and after a fan-on delay selected by the user, overriding the fan-on duration control. The method comprises monitoring an occupancy sensor signal to determine an occupancy in a conditioned space served by an HVAC system and automatically overriding the fan-on duration control to save energy when the conditioned space is unoccupied. The overriding may comprise waiting until after a fan-off delay, operating the HVAC fan in auto mode based only on a thermostat call for cooling or a thermostat call for heating, controlling an economizer damper to reduce or increase outdoor airflow, and operating the HVAC fan for a variable fan-off delay after the thermostat call for cooling or heating based on the duration of the thermostat call for cooling or heating.

23 Claims, 2 Drawing Sheets

Related U.S. Application Data which is a continuation-in-part of application No. 17/958,069, filed on Sep. 30, 2022, now Pat. No. 11,879,651, which is a continuation-in-part of application No. 17/526,725, filed on Nov. 15, 2021, now Pat. No. 11,460,208, which is a continuation-in-part of application No. 16/909,752, filed on Jun. 23, 2020, now Pat. No. 11,175,060, which is a continuation-in-part of application No. 16/897,634, filed on Jun. 10, 2020, now Pat. No. 11,029,057, which is a continuation-in-part of application No. 16/882,222, filed on May 22, 2020, now Pat. No. 11,029,061, which is a continuation-in-part of application No. 16/869,396, filed on May 7, 2020, now Pat. No. 11,022,335, which is a continuation-in-part of application No. 16/565,464, filed on Sep. 9, 2019, now Pat. No. 11,187,425, which is a continuation-in-part of application No. 16/289,313, filed on Feb. 28, 2019, now Pat. No. 10,712,036, said application No. 16/869,396 is a continuation-in-part of application No. 16/011,120, filed on Jun. 18, 2018, now Pat. No. 10,663,186, said application No. 16/289,313 is a continuation-in-part of application No. 15/614,600, filed on Jun. 5, 2017, now Pat. No. 10,281,938, which is a continuation-in-part of application No. 15/358,131, filed on Nov. 22, 2016, now Pat. No. 9,671,125, said application No. 16/011,120 is a continuation-in-part of application No. 15/169,586, filed on May 31, 2016, now Pat. No. 10,001,289.

(60) Provisional application No. 62/728,518, filed on Sep. 7, 2018.

(51) Int. Cl.
| | |
|---|---|
| *F24F 11/52* | (2018.01) |
| *F24F 11/77* | (2018.01) |
| *F24F 110/10* | (2018.01) |
| *F24F 120/10* | (2018.01) |

(56) References Cited

U.S. PATENT DOCUMENTS

| | | | |
|---|---|---|---|
| 5,996,898 | A | 12/1999 | Parker et al. |
| 7,469,550 | B2 | 12/2008 | Chapman, Jr. et al. |
| 9,784,468 | B2 | 10/2017 | Bisson et al. |
| 11,879,651 | B2 * | 1/2024 | Mowris ............... F24F 11/61 |
| 12,066,200 | B2 * | 8/2024 | Mowris ............... F24F 11/77 |
| 2002/0090908 | A1 | 7/2002 | Estepp |
| 2006/0219382 | A1 * | 10/2006 | Johnson ............. B60H 1/00757 |
| | | | 165/11.1 |
| 2008/0277486 | A1 | 11/2008 | Seem et al. |
| 2009/0032236 | A1 * | 2/2009 | Geadelmann ............ F24F 11/46 |
| | | | 165/247 |
| 2014/0195106 | A1 | 7/2014 | McQuade et al. |
| 2015/0204571 | A1 | 7/2015 | Messmer et al. |
| 2017/0299212 | A1 | 10/2017 | Svitak et al. |
| 2018/0320916 | A1 | 11/2018 | Vincitore et al. |

OTHER PUBLICATIONS

US Energy Information Administration (EIA), 2018 Commercial Buildings Energy Consumption Survey: Consumption and Expenditures Highlights, Dec. 2022, US EIA, Washington DC.
US Energy Information Administration (EIA), Use of energy explained Energy use in homes, May 2019, US EIA, Washington DC.
US Energy Information Administration (EIA), 2012 Commercial Buildings Energy Consumption Survey: Energy Usage Summary, May 2021, US EIA, Washington DC.
Scott Pigg, Electricity Use by New Furnaces: A Wisconsin Field Study, Oct. 2003, Wisconsin Department of Administration Division of Energy, Madison, WI.
Tom Talerico and Rick Winch, ECM Furnace Impact Assessment Report, Jan. 2009, Public Service Commission of Wisconsin, Madison, WI.
Scott Pigg and Tom Talerico, Electricity Savings from Variable-Speed Furnaces in Cold Climates, 2004, American Council for an Energy Efficient Economy (ACEEE).
Honeywell, How Does the Fan Auto/On Switch or Key Work?, Jan. 2022, Resideo Technologies, Inc.
Vega-Barbas et al., AFOROS: A Low-Cost Wi-Fi-Based Monitoring System for Estimating Occupancy of Public Spaces, Sensors, Jun. 2021, Multidisciplinary Digital Publishing Institute (MDPI), Basel, Switzerland.
Bakker et al, Bacterial and fungal ecology on air conditioning cooling coils is influenced by climate and building factors, Indoor Air, Dec. 2019, John Wiley & Sons Ltd.
Woolley et al, Why Occupancy-Responsive Adaptive Thermostats Do Not Always Save—and the Limits for When They Should, ACEEE Summer Study on Energy Efficiency in Buildings, 2014.
Akane Karasawa and Amber Zepeda, Occupancy-based Thermostat Control for Commercial Offices Final Report ET22SWE0023, Feb. 2023, CalNEXT.
DNV GL Energy Insights USA, Inc., 2019 California Residential Appliance Saturation Study (RASS), May 2021, California Energy Commission.
U.S. Energy Information Administration, 2015 Residential Energy Consumption Survey: Energy Consumption and Expenditures Tables, May 2018, U.S. Energy Information Administration.
Akane Karawasa and Antonio Corradini, Occupancy-based Thermostat for Commercial Offices ET17SDG8031 Report, Jan. 2021, San Diego Gas & Electric Emerging Technologies Program.
Tom Talerico and Rick Winch, ECM Furnace Impact Assessment Report, Jun. 2004, Wisconsin Department of Administration Division of Energy.
Carrier Corporation, Totaline Gold Commercial Thermostat Installation and Operating Instructions, Nov. 1999.
Ecobee Inc., How to control your HVAC system's fan with your ecobee thermostat, Nov. 2021.
Google Inc., How to control your fan with a Nest thermostat, Dec. 2019.
Leviton Manufacturing Co., Inc., Product Data: Multi-Technology Ceiling Occupancy Sensor with Isolated Relay, 2018.
US Energy Information Administration (EIA), Use of energy explained Energy use in homes, Dec. 2023, US EIA, Washington DC.
American Society of Heating, Refrigerating, and Air Conditioning Engineers (ASHRAE), ANSI/ASHRAE Standard 62.1-2022 Ventilation and Acceptable Indoor Air Quality, Standard, 2022, ASHRAE.
American Society of Heating, Refrigerating, and Air Conditioning Engineers (ASHRAE), ANSI/ASHRAE Standard 62.1-2013 Ventilation for Acceptable Indoor Air Quality, Standard, 2013, ASHRAE.

* cited by examiner

OCCUPANCY FAN CONTROLLER

REFERENCE TO RELATED APPLICATIONS

The present application is a Continuation In Part (CIP) of application Ser. No. 18/419,407 filed Jan. 22, 2024, which is a CIP of application Ser. No. 17/958,069 filed Sep. 30, 2022, which is a CIP of application Ser. No. 17/526,725 filed Nov. 15, 2021, which is a CIP of application Ser. No. 16/909,752 filed Jun. 23, 2020, which is a CIP of application Ser. No. 16/897,634 filed Jun. 10, 2020, which is a CIP of application Ser. No. 16/882,222 filed May 22, 2020, which is a CIP of application Ser. No. 16/869,396 filed May 7, 2020, which is a CIP of application Ser. No. 16/565,464 filed Sep. 9, 2019, which is a CIP of application Ser. No. 16/289,313 filed Feb. 28, 2019, which is a CIP of application Ser. No. 15/614,600 filed Jun. 5, 2017, which is a CIP of application Ser. No. 15/358,131 filed Nov. 22, 2016, and the said application Ser. No. 16/565,464 filed Sep. 9, 2019 which claims the priority of U.S. provisional application Ser. No. 62/728,518 filed Sep. 7, 2018, and said application Ser. No. 16/869,396 filed May 7, 2020, is a CIP of application Ser. No. 16/011,120 filed Jun. 18, 2018, which is a CIP of application Ser. No. 15/169,586 filed May 31, 2016, the present application claiming the priority of the above applications which are incorporated in their entirety herein by reference.

BACKGROUND

The application relates to a Heating, Ventilating, and Air Conditioning (HVAC) systems.

Known HVAC systems are controlled by thermostats or Energy Management Systems (EMS). Research studies show that 9 to 46% of residential occupants select continuous or hourly HVAC fan-on controls which increases fan electricity use by 125 to 3520 kWh/yr representing 2.7% to 34% of total residential electricity use (based on information and studies cited below).

The HVAC fan-on energy use for commercial buildings is significantly higher than residential buildings due to operating the HVAC fans continuously to meet minimum outdoor airflow requirements per the American Society of Heating Refrigeration and Air-Conditioning Engineers (ASHRAE) Standard 62.1 (ANSI/ASHRAE 62.1-2022. Standard Ventilation for Acceptable Indoor Air Quality). When commercial buildings are unoccupied at night or on weekends or holidays, about 50 to 80% of buildings continue to operate the HVAC fans continuously to meet minimum outdoor airflow requirements which wastes fan energy and cooling or heating energy to condition the outdoor air. Due to this problem, commercial building ventilation fan energy uses 22.7% of total annual US HVAC energy compared to 20.5% for cooling and 56.8% for heating. Moreover, about 10 to 20% of cooling and heating energy is due to ventilation fans operating continuously when buildings are unoccupied. See US Energy Information Administration (EIA) 2019. Commercial Buildings Energy Consumption Survey (CBECS). Washington, DC: EIA. https://www.eia.gov/consumption/.

Non patent publication UNITED STATES ENERGY INFORMATION ADMINISTRATION (US EIA). Use of energy explained Energy use in homes. May 2019. Pages: 5. US EIA. Washington DC. USA. https://www.eia.gov/energyexplained/use-of-energy/homes.php. Page 1 indicates miscellaneous end uses accounted for 21% of total residential end-use consumption for all U.S. homes in 2015. Page 3 indicates the U.S. residential sector energy consumption was 11.63 quadrillion British thermal units (quads) in 2020. The range of total electricity use is 4581 kWh/yr for apartments (5+) in the West, 12,815 for mobile homes in the Midwest, to 15,819 kWh/yr for single family homes in the South. For all homes the US EIA average range is 8211 kWh/yr in the Northeast to 13895 kWh/yr in the South. Assuming HVAC fan-on energy use accounts for 13% of total miscellaneous electricity use or 2.7% of the total provides a range of 125 to 432 kWh/yr. For circulate fan-on settings (20 minutes/hr) the HVAC fan-on energy will be 583 to 1459 kWh/yr, and for continuous settings the HVAC fan-on energy will be 1054 to 3520 kWh/yr.

Non patent publication by UNITED STATES ENERGY INFORMATION ADMINISTRATION (US EIA). 2012 Commercial Buildings Energy Consumption Survey: Energy Usage Summary. May 2021. Pages: 6. US EIA. Washington DC. USA. https://www.eia.gov/consumption/commercial/reports/2012/energyusage/index.php. FIG. 5 shows heating 25%, ventilation 10% and cooling 9% of the total. Within commercial HVAC ventilation is 22.7%, cooling is 20.5%, and heating is 56.8%.

Non patent publication by DNVGL Impact Evaluation of 2013-14 HVAC3 Commercial Quality Maintenance Programs. April 2016. Pages: 267. California Public Utilities Commission (CPUC). San Francisco, CA. USA http://www.calmac.org/publications/HVAC3ImpactReport_0401.pdf. DNVGL page 68 reports 78% of commercial buildings in Southern California Edison (SCE) had HVAC "fans running continuously in the as-found case" (per FIG. 17 on p. 68). Page 69 reports 97.2% of participants sites had the HVAC fan running continuously per "FIG. 18. SCE Commercial QM implementer supply fan treatment when found on."

Non patent publication by SCOTT PIGG. Electricity Use by New Furnaces: A Wisconsin Field Study. Technical Report 230-1. October 2003. Pages: 71. Wisconsin Department of Administration (DOA) Division of Energy. Madison, Wisconsin. USA. https://www.proctoreng.com/dnld/WIDOE2013.pdf. This study monitored 31 homes wherein 16% operated the HVAC fan continuously and 19% operated the HVAC fan sporadically (referred to hereafter as "hourly").

Non patent publication by TOM TALERICO. ECM Furnace Impact Assessment Report. Jun. 28, 2004. Pages: 192. Wisconsin DOA Division of Energy. Madison, Wisconsin. USA. library.cee1.org/system/files/library/1814/997.pdf. The study monitored 150 participant homes and 36 nonparticipant homes where 28% to 46% of participants and 8.4% to 22.2% of non-participants operated the HVAC fan continuously or hourly. Page C-2 cites reasons given by occupants for HVAC fan-on controls. "Contractor said this was the most efficient way to operate it. Contractor said to operate it all the time throughout the year because it was better and would not use more energy. Contractor said to run it all the time. Contractor said to run it all the time when heating."

Non patent publication by TOM TALERICO. ECM Furnace Impact Assessment Report. January 2009. Pages: 78. Wisc. DOA Division of Energy. Madison, WI. USA. https://focusonenergy.com/sites/default/files/emcfurnaceimpactassessment_evaluationreport.pdf. This study reports 18.6% to 34.7% of 150 participants and 9.7% to 17.1% of 82 non-participants operated the HVAC fan continuously or hourly. Page 1-3 states "Almost 70 percent of HVAC contractors always recommend continuous fan operation to ECM furnace purchasers who were previously operating their fan in auto mode and none never do. On the other hand, only 20 percent of HVAC contractors reported that they always recommend continuous fan operation to non-ECM furnace purchasers previously operating in auto mode and over half said that they never do."

Non Patent publication by SCOTT PIGG and TOM TALERICO. Electricity Savings from Variable-Speed Furnaces in Cold Climates. August 2004. Pages 16. American Council for an Energy Efficient Economy (ACEEE) Summer Study on Energy Efficiency in Buildings, Asilomar, CA, Published by ACEEE. Washington DC. USA. https://www.aceee.org/files/proceedings/2004/data/papers/SS04_Panel1_Paper23.pdf. Page 9 reports 3,700 kWh/yr of fan energy use (non heat or cool) for the HVAC fan-on continuously with a standard fan motor and 740 kWh/yr with an efficient motor. Table 2, page 10 provides HVAC fan operation practices for 300 participants and 136 nonparticipants indicating 9 to 35% of participants and 11% to 14% of non-participants, operated the HVAC fan continuously or hourly.

Non Patent publication by AMERICAN SOCIETY OF HEATING, REFRIGERATING, AND AIR-CONDITIONING ENGINEERS (ASHRAE). Standard 62.1 (ANSI/ASHRAE 62.1-2022. Standard Ventilation for Acceptable Indoor Air Quality). 2022. Pages: 86. ASHRAE. Atlanta, GA. USA https://www.ashrae.org/technical-resources/bookstore/standards-62-1-62-2

Non-patent publication by CARRIER CORPORATION INC., Totaline Gold Commercial Thermostat Installation and Operating Instructions. Date: November 1999. Pages: 12, United Technologies Corporation, One Carrier Place, Farmington, CT 06034-4015 USA https://dms.hvacpartners.com/docs/1005/Public/08/P274-2SI.pdf. Page 9 provides configuration instructions to "Allow Continuous Fan During Unoccupied Hours." When configuration is set to ON and fan is set to ON, the fan will run continuously during unoccupied periods. Default is fan ON during unoccupied periods.

Non-patent publication by ECOBEE INC., "How to control your HVAC system's fan with your ecobee thermostat" Date: Jan. 13, 2020, Page 7, Published by Ecobee Inc. 25 Dockside Dr Suite 700, Toronto, ON M5A 0B5, Canada https://support.ecobee.com/s/articles/How-to-control-your-HVAC-system-s-fan-with-your-ecobee-thermostat. Ecobee hourly HVAC fan-on control. "If the fan minimum run time is set for 15 minutes or lower, the fan will operate in two separate segments across the hour; if the fan minimum run time is set for 20 minutes or higher, the fan will run in four equal segments across the hour. If a heating or cooling cycle operates within any given hour, the length of either cycle will be deducted from the fan minimum run time."

Non-patent publication by GOOGLE INC. "How to Control Your Fan with a Nest Thermostat," Date: Dec. 30, 2019, Pages 1, Published by Google, Inc. 1600 Amphitheatre Parkway, Mountain View, Calif. 94043 USA. https://support.google.com/googlenest/answer/9296419?hl=en. Google describes a fan control for an hourly fan-on duration or a daily fan-on duration schedule.

Non-patent publication by HONEYWELL. "How Does the Fan Auto/On Switch or Key Work?" Date: Jan. 31, 2022. Pages 1, Honeywell Inc., Golden Valley, Minn. 55422 https://www.honeywellhome.com/us/en/support/7-day-programmable-thermostats-3/. Honeywell describes: "The Circ (Circulate) position, if available, will run the fan approximately 35% of the time, roughly 20 minutes each hour (2 ten-minute periods), minus any time the fan is already running with the heating or cooling system."

Non-patent publication M. VEGA-BARBAS ET AL., "AFOROS: A Low-Cost Wi-Fi-Based Monitoring System for Estimating Occupancy of Public Spaces," Date: June 2021, Pages 20, Multidisciplinary Digital Publishing Institute (MDPI). Basel, Switzerland. https://www.mdpi.com/1424-8220/21/11/3863. Discloses a method for passive monitoring using Wi-Fi "probe request" messages transmitted by smartphones to determine Wi-Fi access points using Media Access Control (MAC) addresses to detect occupancy based on stationary and mobile MAC addresses.

Non patent publication Bakker, A., Siegel, J., Mendell, M., Prussin, A., Marr, L., Peccia, J. 2019. Bacterial and fungal ecology on air conditioning cooling coils is influenced by climate and building factors. Indoor Air. 30. 10.1111/ina.12632. pubmed.ncbi.nlm.nih.gov/31845419/

Bagno U.S. Pat. No. 2,655,645 (Bagno '645) filed in 1947 discloses an occupancy sensor method and apparatus for detecting motion in a confined space.

US Patent Application US 2015/0204571 A1 (Messmer '571) discloses mode one to minimize outdoor airflow into a building to minimize energy used to heat or cool outdoor air. Mode two minimizes the time to deliver fresh air while the system is not heating or cooling air to minimize discomfort for occupants.

Chapman et al. U.S. Pat. No. 7,469,550 ('550) is an energy saving control for appliances via an intelligent thermostat that provides programmatic control over the HVAC system and appliances via a communications network.

Parker U.S. Pat. No. 5,996,898 ('898) assigned to University of Central Florida, describes a control for turning a ceiling fan on and off based on a passive infrared sensor, combined with a temperature sensor to regulate the speed of the fan.

Lutron and Leviton occupancy sensors provide 277V, 120V, or 24 VDC output signals compatible with lighting systems, exhaust fans, and wall switches. Lutron and Leviton also make occupancy sensors with an isolated dry-contact relay output. See: leviton.com/en/products/osc20-rmw, lutron.com/TechnicalDocumentLibrary/369653.pdf Bisson U.S. Pat. No. 9,784,468B2 (Bisson '468) discloses a thermostat with a fan schedule providing automatic, ON, or circulation options. Col. 38, lines 55-56: to allow a user to view and/or verify their HVAC system schedule."

Geadelmann et al., US Patent Application Publication no. 2009/0032236 (Geadelmann '236) discloses a method for a user to enter a manually selected fan speed setting, and detects the manual fan speed and temporarily changes from the Auto fan speed to the manual fan speed for a predetermined time until a timer expires.

Johnson et al. US Patent Application No. 2006/0219382 (Johnson '382) discloses a control system for disabling a fan of a HVAC system upon the detection of an audible alarm from an independent source, such as a smoke alarm. The fan is disabled when the HVAC is off, operating in heating, cooling, or manual fan-on mode.

McQuade et al. US Patent Application Publication No. 2014/0195106 (McQuade '106) discloses a method for monitoring driver behaviors and manual overrides for cooling fan settings in fleet vehicles.

Estepp et al. US Patent Application Publication No. 2002/0090908 (Estepp '908) discloses an economizer demand ventilation module for an HVAC system that automatically shifts the damper in proportion to real-time conditions.

US Patent Application US 2008/0277486 (Seem '486) discloses a method for controlling an HVAC system based on occupancy.

European Patent EP2906880B1 (Du Li '880) discloses a coarse-grained sensor indicating an area is unoccupied based on Wi-Fi signals from mobile devices, where the entire HVAC system and lights in the area can be turned off or adjusted to save energy.

Svitak et. al. US Patent Application Publication No. 20170299212) (Svitak '212) discloses controlling an activation and deactivation of an exhaust fan controlled by a humidistat where the exhaust fan is activated based on a measured humidity value exceeding a humidity activation criterion in a lookup table.

US Patent Application US 2018/0320916 A1 (Vincitore et al. '916) discloses a method for controlling an atmospheric condition of a space (e.g., temperature) with a plurality of air manipulation components based on mobile devices within the space.

Woolley, J., Pritoni, M., Modera, M. Peffer, T. 2014. Why occupancy-responsive adaptive thermostats do not always save—and the limits for when they should. ACEEE Summer Study on Energy Efficiency in Buildings, 337-350. Washington. DC. USA. Describes Telkonet occupancy-responsive thermostats which change thermostat setpoints (cooling or heating) based on occupancy. https://www.aceee.org/files/proceedings/2014/data/papers/3-490.pdf.

A. Karasawa and A. Corradini. 2021. Occupancy Thermostat for Commercial Offices. ET17SDG8031 Report. Prepared for Emerging Technologies Program. Prepared by AESC Inc. Describes Telkonet occupancy-based thermostat which changes thermostat setpoints (cooling or heating) based on occupancy and changes fan operation from continuous to only operate based on occupancy in at least one of four offices. Reported HVAC energy savings are 9.5%. file:///mac/Home/Downloads/et17sdg8031_-_occupancy-based_thermostat_for_commercial_offices.pdf.

A. Karasawa and A. Zepeda. 2022. Occupancy-based Thermostat Control for Commercial Offices Final Report, ET22SWE0023. Prepared for CalNEXT. Prepared by ASK Energy Inc. Describes Telkonet occupancy-based thermostat which changes thermostat setpoints (cooling or heating) based on occupancy and changes fan operation from continuous to only operate based on occupancy at two offices in San Diego County. Reported HVAC energy savings are 15 to 34%. https://calnext.com/wp-content/uploads/2023/02/ET22SWE0023-Occupancy-based-Thermostats-for-Commercial-Offices-Final-Report.pdf Known prior art HVAC systems, sensors, and controls indicate an unresolved need to reduce ventilation fan energy use.

BRIEF SUMMARY

The application addresses the above and other needs by providing one or more embodiments of an Occupancy Fan Control (OFC) method for a Heating, Ventilating, Air Conditioning (HVAC) fan to improve energy efficiency, indoor air quality, and occupant comfort. The OFC method detects the HVAC fan is controlled by at least one fan-on duration control selected by a user with a User Interface (UI). The at least one fan-on duration control operates the HVAC fan to recirculate air in a conditioned space for the at least one fan-on duration selected by the user. In one embodiment, the method provides at least one fan-on alarm message prior to overriding the at least one fan-on duration control. In another embodiment, the OFC method monitors an occupancy sensor signal from an occupancy sensor configured to determine an occupancy in a conditioned space served by an HVAC system and automatically overrides the at least one fan-on duration control to save energy when the conditioned space is unoccupied based on the occupancy sensor signal. The overriding comprises at least one method selected from the group consisting of: operating the HVAC fan based only on a thermostat call for cooling or a thermostat call for heating, operating the HVAC fan for less time than the at least one fan-on duration control selected by the user, and operating the HVAC fan for less frequency than the at least one fan-on duration control selected by the user. In another embodiment, the method changes the at least one fan-on duration control to an auto setting thus only operating the HVAC fan based on a thermostat call for cooling or a thermostat call for heating. In yet another embodiment, the method waits until after a fan-on time delay ("fan-on delay") to provide a fan-on alarm message or override the fan-on duration control. The fan-on time delay is selected by a user or based on a duration of the fan-on duration control.

An intermittent fan-on setting or a fan-on schedule operating for only 10 minutes per hour can increase annual fan electricity consumption by about 750 kWh/year for a typical small commercial or residential building. Continuous fan-on settings or fan-on schedules can increase annual fan electricity consumption by 3000 to 4500 kWh/year for a typical single family home. Continuous or intermittent fan-on settings or fan-on schedules will also waste cooling and heating energy use due to increasing the frequency of the thermostat call for a cooling or heating due to increased outdoor airflow from an air economizer and ducts (i.e., duct leakage) and increased outdoor airflow through the building shell from infiltration and exfiltration due to fan-induced indoor-outdoor pressure differences.

The potential energy savings from the OFC method are 2.7% of total residential energy use and 11.2% of total commercial building energy use. Residential buildings in the United States (US) consume about 11.63 Quadrillion Btu per year (Quads/year) and commercial buildings consume about 6.963 Quads/year based on data from the United States (US) Energy Information Administration (EIA). Therefore, potential US annual energy savings for the OFC method are about 1.093 Quads/year (1.093 Quads/year=0.314+0.779=2.7%*11.63+11.2%*6.963). According to US EIA, total US primary energy consumption in 2021 was about 97.3 Quads so the potential energy savings for the method are about 1.1% of total US energy use.

The OFC method differs from known prior art and known occupancy sensors which perform different functions. Chapman '550 turns off appliances based on occupancy sensors. Messmer '571 minimizes outdoor air ventilation to minimize cooling and heating energy. Parker '898 turns off a ceiling fan. Svitak '212 controls activation and deactivation of an exhaust system for ventilating a bathroom using a humidity sensor. Known occupancy sensor dry contact relays can be used to turn off an exhaust fan or an HVAC system. However, turning off an HVAC system with an occupancy sensor dry contact relay will not allow the HVAC fan to operate during the thermostat call for cooling or heating when a building is unoccupied. This may cause health and safety issues when outdoor air temperatures are greater than 95 degrees Fahrenheit (F) or less than 32 F which may cause frozen water pipes.

Prior art patents do not disclose the OFC method. Bisson '468 discloses a thermostat with a fan schedule providing automatic, ON, or circulation options. Geadelmann '236 detects a manually selected fan speed and temporarily changes from the Auto fan speed to the manually selected fan speed until a timer expires. Johnson '382 turns off the HVAC fan based on an audible smoke alarm. McQuade '106 monitors manual overrides for cooling fans in fleet vehicles, and Estepp '908 controls a damper for an economizer demand control ventilation module. Du Li '880 discloses turning off or adjusting HVAC or lighting systems based on occupancy. Vincitore '916 discloses controlling temperature and/or humidity of a space based on occupancy. Seem '486 discloses a method for controlling an HVAC system based on occupancy. Du Li '880, Vincitore '916, and Seem '486 do not disclose turning off or adjusting a fan-on duration control selected by a user based on occupancy sensor signals. Applying known occupancy sensor methods invented in 1947 by Bagno '645 have not resolved the unresolved fan-on energy use problem when buildings are unoccupied.

Known patents and occupancy sensors do not disclose detecting the HVAC fan is controlled by at least one fan-on duration control selected by a user and providing at least one fan-on alarm message prior to overriding the at least one fan-on duration control. Furthermore, known patents and occupancy sensors do not disclose overriding the at least one fan-on duration control selected by a user based on occupancy sensor signals, and operating the HVAC fan based only on a thermostat call for cooling or a thermostat call for heating, or operating the HVAC fan for less time and/or less frequency than the at least one fan-on duration control selected by the user. The OFC method is not obvious to persons having ordinary skill in the art due to not considering the HVAC fan-on duration control as a fault and the difficulty of implementing the OFC method with known occupancy sensors and known HVAC fan controls.

A study published by the Wisconsin Division of Energy reports 50 to 70% of residential HVAC contractors recommend operating the HVAC fan-on continuously, sporadically, or hourly. A study published by DNVGL for the California Public Utilities Commission reports 78% of commercial buildings in Southern California had HVAC fans running continuously in the as-found case and 97.2% had HVAC fans running continuously after treatment. By not recognizing the HVAC fan-on duration setting as a fault, approximately 1.1% of total annual US energy is inadvertently wasted due to HVAC fan-on duration control settings in both residential and commercial buildings.

The California Energy Commission (CEC) and the US Energy Information Administration (EIA) do not recognize ventilation fan-only energy as an end use. The California Energy Commission (CEC) combines fan-only energy with miscellaneous end uses. See DNVGL. May 2021. 2019 California Residential Appliance Saturation Study. CEC-200-2021-005-RSLTS. Table 11, p. 16. CEC. Sacramento, CA USA. https://www.energy.ca.gov/sites/default/files/2021-08/CEC-200-2021-005-RSLTS.pdf. The US Energy Information Administration (EIA) combines fan-on energy with other end uses. See USEIA. 2015 Residential Energy Consumption Survey: Energy Consumption and Expenditures Tables. Table CE3.1 Annual household site end-use consumption in the U.S. —totals and averages, 2015. USEIA, Washington, DC. USA. https://www.eia.gov/consumption/residential/data/2015/c&e/pdf/ce3.1.pdf.

Due to fan-only energy not being recognized as an end use and the fan-on duration control not being recognized as a fault, persons of ordinary skill in the art do not recognize the unresolved problems that the OFC method resolves. Combining prior art elements, simple substitution, use of known techniques, applying a known device or method, obvious to try, known work, teachings, suggestions or motivations in the prior art have not led persons of ordinary skill in the art to modify or combine prior art teachings to develop the disclosed OFC method.

Conventional thermostats provide a manual switch to set the HVAC fan-on duration control to an ALWAYS "on" continuous setting or an "AUTO" ("auto") setting where the HVAC fan only operates during the thermostat call for cooling or heating. Smart thermostats provide similar fan-on settings for ALWAYS on and AUTO. Smart thermostats also provide user-selected fan-on settings of 0 to 55 minutes duration with a frequency of one or more periodic cycles within an hour or more where the fan-on duration control settings are divided into two or more durations or time periods per hour. Smart thermostat fan-on settings may also be set to operate every hour of every day (1 to 24 hours/day) or scheduled for specific hours in a weekly or monthly calendar for a user-selected duration and/or frequency. The non-patent publication by Ecobee Inc. describes an hourly HVAC fan-on duration control setting, and the non-patent publication by Google describes an hourly or a daily fan-on duration control schedule.

Known smart thermostats may adjust the intermittent or hourly fan-on duration control setting based on the call for cooling or heating, but known smart thermostats do not modify the duration or the frequency of the total fan-on duration. While known smart thermostats provide manual methods to change the hourly or daily fan-on control, they do not provide methods to detect the HVAC fan is controlled by the fan-on duration control selected by the user and automatically override the fan-on duration control to save energy when the conditioned space is unoccupied based on the occupancy sensor signal. Known smart thermostats do not provide at least one fan-on alarm message prior to overriding the fan-on duration control. Furthermore, known smart thermostats and Energy management Systems (EMS) do not provide methods to override the fan-on duration control when the conditioned space is unoccupied and change the fan-on duration control to operate the HVAC fan based only on a thermostat call for cooling or heating, or operate the HVAC fan for less time and/or less frequency than the fan-on duration control selected by the user.

The HVAC fan-on setting may comprise at least one fan-on duration control setting selected from the group consisting of: a continuous fan-on setting, a fixed-time duration (i.e., 5 minutes to multiple hours), a sporadic fan-on setting, an hourly fan-on setting, an intermittent or periodic fan-on setting, and a scheduled fan-on setting. The at least one fan-on duration control setting is preferably independent of a fan operation based on or associated with the thermostat call for cooling or heating.

The OFC method monitors the fan-on duration and after a fan-on time delay automatically overrides the at least one fan-on duration control to save energy when the at least one fan-on duration is greater than or equal to a Threshold Fan-on Time (TFT) delay. The duration or the frequency of the at least one fan-on duration control is modified but not disabled and may be resumed when the occupancy sensor indicates the conditioned space is occupied. The TFT may vary depending on monitored HVAC parameters with an occupancy sensor or a Carbon Dioxide ($CO_2$) sensor or other sensors to maintain a minimum outdoor airflow or air filtration to meet an indoor air quality requirement.

The OFC method may override the HVAC fan-on duration control setting based on an occupancy sensor signal or a fan-on time delay selected by a user. The OFC method may interface with at least one occupancy sensor technology selected from the group consisting of: a Passive InfraRed (PIR) or Ultrasonic sensor or a geofence location based sensors (LBS) using a Global Positioning System (GPS), a cellular network, a Wireless Fidelity (Wi-Fi) network, a Radio Frequency Identification (RFID) network, or passive monitoring of Wi-Fi devices.

Geofence technology is used by smart thermostats to adjust temperatures when residents are away, but not used to modify HVAC fan-on settings when a space served by an HVAC system is unoccupied. Passive monitoring of Wi-Fi uses "probe request" messages periodically transmitted by smartphones to determine Wi-Fi access points in the vicinity. The method uses Media Access Control (MAC) addresses to detect occupancy based on stationary and mobile MAC addresses. The occupancy estimate is based on analysis of MAC address randomization. The passive monitoring method uses Wi-Fi sensors to analyze other fields present in the header of the IEEE 802.11 frames to extract unique information from each smartphone or Wi-Fi device (printer, router, smart thermostat, HDTV, audio, appliance, vehicle, etc.). Passive monitoring of Wi-Fi devices can provide occupancy estimates with 95% accuracy.

For commercial buildings a tolerance of 0 to +5 mobile MAC addresses may be sufficient to determine a minimum occupancy in a conditioned space served by the HVAC system to modify or change a fan-on setting to an auto setting to save energy. Modifying a continuous fan-on setting to an incremental fan-on setting may be performed in increments of 2 to 6 minutes per MAC address up to 30 minutes depending on airflow rates. The maximum airflow rate might be 20% less than the at least one fan-on duration control based on the upper limit of detected MAC addresses.

The OFC method may also comprise overriding or superseding the fan-on setting, modifying the fan-on setting, and turning off the HVAC fan based on a user response to the at least one fan-on alarm message. The fan-on setting may comprise at least one fan-on setting selected from the group consisting of: a continuous fan-on setting, an intermittent fan-on setting, an hourly intermittent fan-on setting, a daily intermittent fan-on setting, and a scheduled fan-on setting. The TFT is preferably at least one time period or duration selected from the group consisting of: 60 minutes, adjustable from 60 minutes based on at least one indoor air quality measurement, and a sum of an intermittent fan-on duration of at least 60 minutes over 1 to 12 hours.

Overriding the fan-on setting and turning off the HVAC fan may comprise at least one action selected from the group consisting of: waiting for an OFC fan-off delay ("OFC fan-off time delay", "fan-off time delay", "fan-off delay") and turning off the HVAC fan, turning off the HVAC fan, turning off the HVAC fan for a variable or a fixed time period, turning off the HVAC fan for 0% to 100% of a scheduled fan-on time, skipping a scheduled fan-on setting by not turning on the HVAC fan, turning off the HVAC fan for a fraction of a scheduled fan-on time, turning off the HVAC fan for a fraction of time based on a thermostat call for cooling or a thermostat call for heating, and turning off the HVAC fan based on a geofencing or an occupancy sensor signal. The call for cooling or heating may be based on a thermostat first-stage signal or a thermostat second-stage signal.

The OFC method may comprise an OFC fan-off time delay based on the occupancy sensor signal. The OFC fan-off delay may start when the occupancy sensor detects no occupancy and continues from 10 to 60 minutes or longer based on a user input of a default value. In an embodiment, the OFC method may comprise the steps of allowing the user to select the fan-off delay or allowing the fan-off delay to remain a default value, wherein the default value is based on the at least one fan-on duration control. The OFC fan-off time delay may be set to a few seconds for testing the operation of the OFC by an installer. The OFC may also comprise overriding an economizer controller to close an economizer damper to reduce outdoor airflow and save energy during fan-only operation or a thermostat call for cooling or heating when the conditioned space is unoccupied. The OFC method may also reduce fan speed and deliver less airflow and partially close the economizer damper when the conditioned space is partially occupied at less than 100% of the design occupancy or the peak occupancy to save energy. When operating in auto mode, the OFC provides variable fan-off delays at the end of cooling or heating cycles to improve comfort and indoor air quality, lengthen off-cycle times, and save energy. Cooling variable fan-off delays improve comfort and indoor air quality by removing 0.6 to 0.8 pounds (lbs.) of water from evaporator coils after each cooling cycle preventing biofilm formation caused by colonies of bacteria, viruses, fungi, and mold. Biofilms on cooling evaporator coils can significantly reduce airflow and heat transfer efficiency and may lead to aerosolization of microbes into occupied spaces of a building causing diseases and allergies. Furthermore, heating variable fan-off delays allow for the circulation of heated air heating cycles to recover heating energy and improve comfort and efficiency.

BRIEF DESCRIPTION OF DRAWINGS

The above and other aspects, features and advantages of the Occupancy Fan Controller (OFC) method will be more apparent from the following brief description of the drawings.

Corresponding reference characters indicate corresponding components throughout several views of the drawings.

DETAILED DESCRIPTION

The following description is of the best mode presently contemplated for carrying out the Occupancy Fan Controller (OFC) method. This description is not to be taken in a limiting sense but is made merely for the purpose of describing one or more preferred embodiments of the disclosed OFC method. The scope of the OFC method should be determined based on the claims.

Where the terms "about" or "generally" are associated with an element of the OFC method, it is intended to describe a feature's appearance to the human eye or human perception, and not a precise measurement, or within 10 percent of a stated value.

Figure 1:
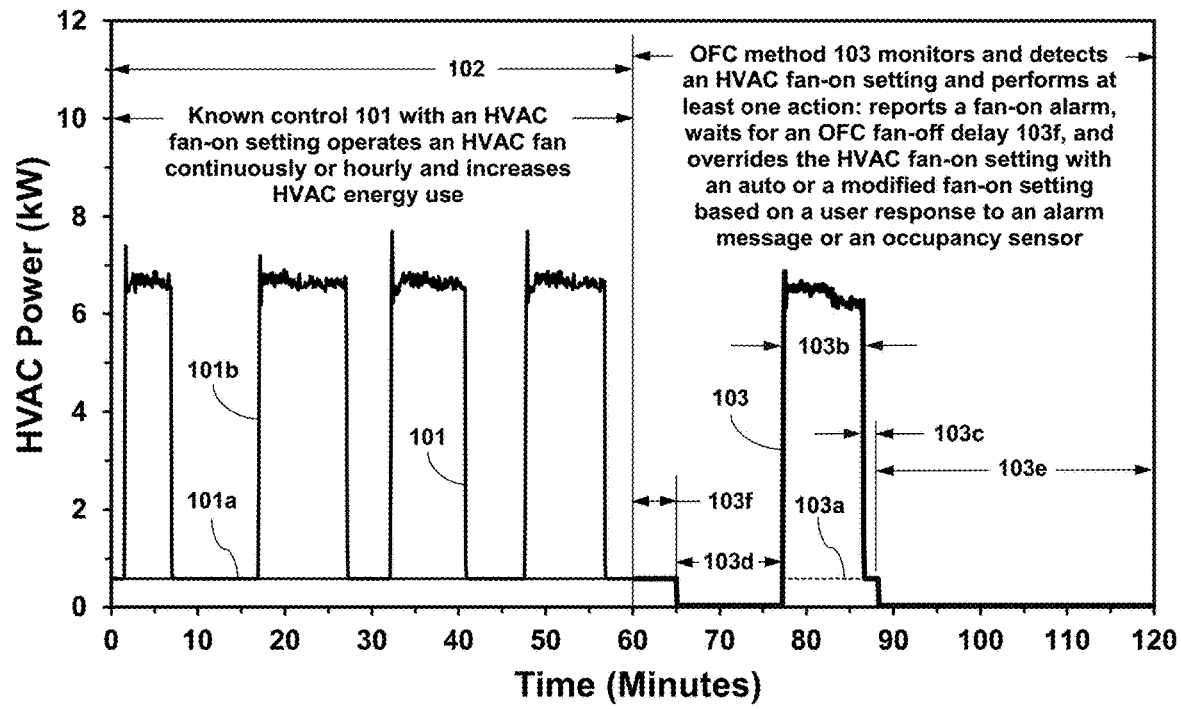
FIG. 1 provides measurements representing the total HVAC system power (kW) versus time of operation for a known control and the Occupancy Fan Control (OFC) method modifying a fan-on setting or overriding to an auto setting and only operating the fan based on a thermostat call for cooling or heating.

FIG. 1 shows a known control 101 representing the total Heating, Ventilating, Air Conditioning (HVAC) system power (kW) versus time of operation with at least one fan-on duration control selected by a user operating an HVAC fan continuously, hourly, or intermittently. The known control 101 operates the known HVAC fan 101a for a time of 60 minutes which uses 0.6 kW of constant fan power and operates the known HVAC system 101b for about 30 minutes which uses about 6.5 kW during four thermostat calls for cooling. The thermostat cycles on the HVAC system more with continuous fan operation due to duct leakage or economizer outdoor airflow. FIG. 1 also shows an embodiment of the OFC method 103. The method monitors and detects an HVAC fan-on setting and after a fan-on time delay overrides the known control 101 and operates the HVAC fan based only on a thermostat call for cooling or heating to save 75% on HVAC energy compared to the known control 101. A known HVAC system controlled by a known occupancy sensor would not allow the HVAC system 103b or the HVAC fan 103a to operate based on a thermostat call for cooling when the space is unoccupied.

FIG. 1 shows the OFC method 103 saves HVAC energy by monitoring and detecting an at least one fan-on duration control selected by a user, and after a fan-on time delay, waiting for an OFC fan-off delay 103f, and overriding the at least one fan-on duration control based on a response to a fan-on alarm message or overriding based on an occupancy sensor signal. The OFC fan-on alarm message provides options to reduce, modify, or change a duration or a frequency of the at least one fan-on duration control to save energy. The overriding may comprise operating the HVAC fan based only on a thermostat call for cooling or heating or operating the HVAC fan for less time and/or less frequency than the fan-on duration control selected by the user.

FIG. 1 shows the known control 101 operating the known HVAC fan 101a continuously for a fan-on setting from 0 to 60 minutes. The fan-on duration may be controlled by a fan-on delay 102 selected by a user. It should be understood that this fan-on delay may be fixed (e.g., 60 mins) or variable depending on occupancy of building, indoor air quality, and the like. Continuous HVAC fan operation causes the thermostat to operate the known HVAC system 101b for four durations due to outdoor air drawn into the conditioned space from duct leakage or economizer outdoor airflow. FIG. 1 shows the OFC method 103 waiting for an OFC fan-off delay 103f and overriding the known control 101 with an auto setting and only operating the HVAC system 103b during a thermostat call for cooling for a single 10-minute period and the HVAC fan 103a operating for 11.5 minutes which includes a variable fan-off delay 103c based on the cooling or heating cycle duration where the HVAC fan operation is based only on a thermostat call for cooling or heating. The variable fan-off delay 103c is based on the thermostat call for cooling or heating cycle duration and differs from the OFC fan-off delay 103f which is based on the occupancy sensor signal indicating the conditioned space is unoccupied.

When the conditioned space is unoccupied, FIG. 1 shows the OFC fan-off delay 103f with the HVAC fan continuing to operate for 5 minutes and no HVAC fan operation during a first fan auto duration 103d for 12 minutes after the OFC fan-off delay. FIG. 1 also shows no HVAC fan operation during a second fan auto duration 103e for 31.5 minutes when the conditioned space is unoccupied. When the conditioned space is occupied, the OFC method provides a fan-on alarm message with options for a user to reduce the duration or the frequency of a fan-on duration control to save energy. When the conditioned space is unoccupied, the overriding is based on an occupancy sensor signal from an occupancy sensor configured to determine an occupancy in a conditioned space served by the HVAC system. The occupancy sensor signal may comprise a geofence based on a Wi-Fi Location Based Signal (LBS) or other occupancy sensor technology. The automatically overriding may also occur when the fan-on duration is greater than a fan-on delay 102 also referred to as a fan-on time delay or a Threshold Fan-on Time (TFT).

Figure 2:
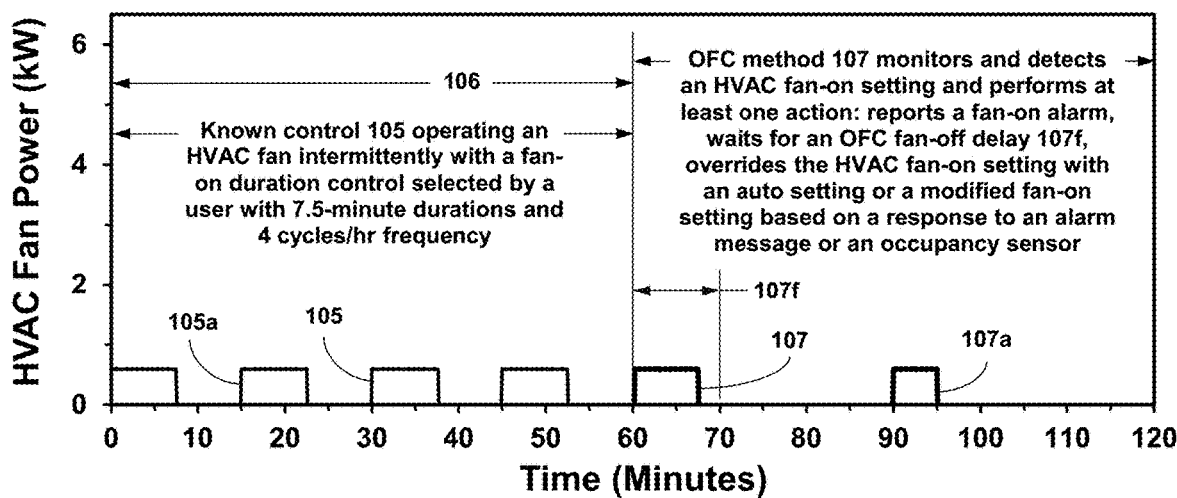
FIG. 2 provides measurements representing the HVAC fan power (KW) versus time of operation for a known control and the OFC method reducing a duration and a frequency of the at least one fan-on duration control to save energy.

FIG. 2 provides measurements representing the HVAC fan power (kW) versus time of operation for a known control 105 and the OFC method 107. The known control 105 operates the HVAC fan 105a intermittently from 0 to 60 minutes with a fan-on duration control selected by a user with four 7.5-minute durations and a frequency of 4 cycles per hour. The OFC method 107 waits for an OFC fan-off delay 107f of about 10 minutes, to override the HVAC fan on setting and during the fan-off delay the OFC method 107 operates the HVAC fan for a 7.5 minute fan duration. After the OFC fan-off delay 107f, the OFC operates the HVAC fan for a 5-minute fan-on duration 107a with a frequency of 2 cycles per hour. The second 5-minute fan-on duration is not shown in FIG. 2. The OFC method 107 monitors and detects the at least one fan-on duration control and after a fan-on time delay 106, reports a fan-on alarm message and waits for an OFC fan-off delay 107f before automatically overriding the at least one fan-on duration control with a zero or non-zero time less than the at least one fan-on duration control or fan-on duration frequency. The overriding may be based on a user response to a fan-on alarm message or an occupancy sensor signal. The overriding may also comprise closing an economizer damper to reduce outdoor airflow and save energy when the conditioned space is unoccupied.

The economizer damper is controlled by an economizer controller which provides an actuator voltage (V) to open the economizer damper to a minimum position when the HVAC fan is energized. The minimum position may vary from 10 to 40% open from 2.8V to 5.2V where 2V is a closed position and 10V is a maximum position where the economizer damper is fully open to provide a maximum outdoor airflow. The maximum position is for economizer cooling where a maximum outdoor airflow is provided to cool the building when the outdoor air temperature is less than the conditioned space temperature. The OFC method signals the economizer controller to close the economizer dampers when the building is unoccupied to reduce outdoor airflow and save energy. However, the OFC will allow the economizer damper to fully open for economizer cooling when the building is unoccupied to reduce mechanical compressor-based cooling. The OFC communicates with the HVAC system and economizer controller using a wired low voltage or ethernet signal or a wireless signal.

As is understood, the disclosed OFC method may be configured to control an economizer damper's position in order to adjust the flow of air between the outside of the building and the HVAC system. In an embodiment, controlling an economizer damper position in order to adjust the outdoor airflow may comprise: closing the economizer damper and operating the HVAC fan based on a thermostat call for heating or cooling, opening the economizer damper, and/or modulating the economizer damper between an open and closed position. As is understood, closing the economizer damper is configured to cut off the flow of air between the external environment (e.g., outside the building) and HVAC system, whereas opening the economizer damper is configured to allow air to flow between the external environment and the HVAC system.

In certain embodiments of the OFC method, the economizer damper may be modulated such that position of the economizer damper varies between intermediate positions between (and including) fully opened and fully closed, over time. In such an embodiment, the position of the economizer damper may be varied based on a variety of factors, including but not limited to: indoor air quality, outdoor air quality, indoor air temperature, outdoor air temperature, indoor occupancy, time, etc. In an embodiment, while the building is partially occupied (e.g., 50% of the design capacity), the OFC method may modulate the economizer damper to 50% or less of an intermediate position to provide 50% or less outdoor airflow, but when the occupancy sensor no longer detects people within the building (e.g., the building is unoccupied) the OFC method may modulate the economizer damper to a fully closed position. In an embodiment, when the indoor air temperature is greater than the outdoor air temperature, and the HVAC system has been heating the building while it is unoccupied, the economizer damper may be closed to reduce outdoor airflow and avoid unnecessarily heating outdoor air. In an alternative embodiment, the position of an economizer damper may vary with time, wherein the economizer damper is configured to be modulated between an intermediate position and a closed position for a set duration of time every hour to maintain indoor air quality. It should be understood that the OFC method may be configured to operate the economizer damper in a plurality of ways not explicitly discussed herein to ensure suitable indoor air quality conditions within a building while saving energy.

FIG. 2 shows the OFC reduces HVAC fan-on energy use by 67% (0.67=1−(5×2)/(7.5×4)=1−10/30). The OFC method may comprise a software application waiting until after a fan-on time delay 106 and providing the fan-on alarm message with an option for a user to select from 0 to 100% savings (e.g., auto setting) for the fan-on duration and/or frequency during periods when the conditioned space is occupied or unoccupied. The fan-on alarm message may ask if a user would like to change to an auto setting or reduce the duration and/or the frequency by, for example 20 to 75%, to save energy or provide a minimum ventilation, air filtration, or outdoor airflow (for an HVAC system with an economizer).

Figure 3:
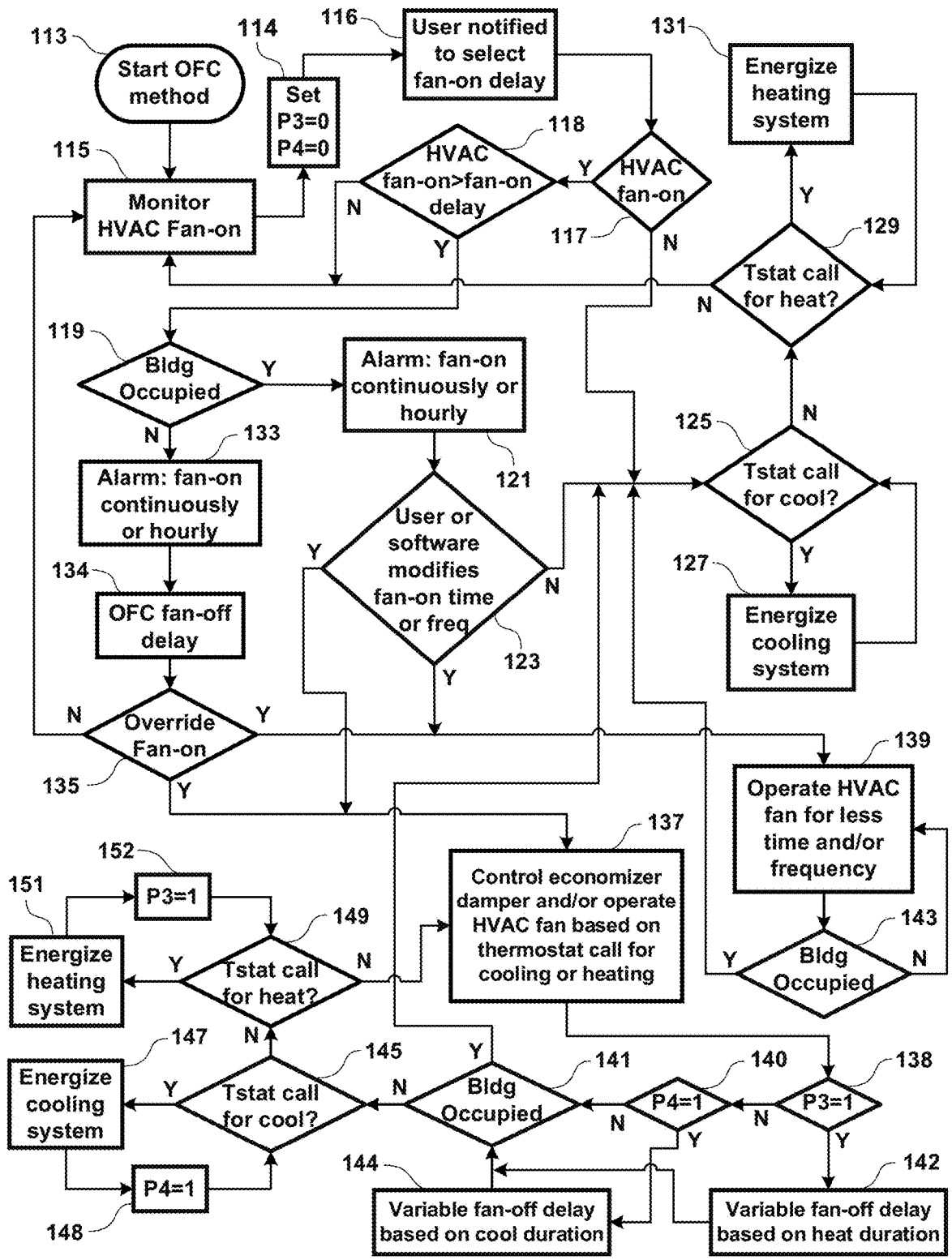
FIG. 3 shows a flow chart of the OFC method, according to an aspect.

FIG. 3 shows a flow chart of the OFC method while the HVAC system is operating. The OFC method may be embodied in a building energy management software system with artificial intelligence using new or existing occupancy sensors. The OFC method starts at step 113 and proceeds to step 115 to monitor the HVAC fan-on. The OFC method may also monitor the HVAC system comprising the HVAC fan-on time, a thermostat call for cooling or heating, and other HVAC system parameters. Other HVAC system parameters may comprise a minimum outdoor airflow, economizer damper position, indoor air quality, carbon dioxide concentration, conditioned space temperature, thermostat setpoints, HVAC system diagnostics, air filter status, static pressure, etc.). At step 114, the method sets P3 equal to 0 (flag for heating cycle when unoccupied) or P4 equal to 0 (flag for cooling cycle when unoccupied) for performing variable fan-off delay. At step 116, a user is notified to select a fan-on time delay. User selects a fan-on time delay or the fan-on time delay is based on the fan-on duration control or a Threshold Fan-on Time (TFT) delay wherein the TFT may vary based on a user input or a default value of 30 seconds to 60 minutes. At step 117 the method detects an HVAC fan-on setting (with or without a thermostat call for cooling or heating). In one embodiment the HVAC fan-on is detected based on a fan G signal and no AC Y or heat W signals. In another OFC embodiment on a smart thermostat or an Energy Management System (EMS), the HVAC fan-on setting is detected in software settings. If step 117 is Yes (Y), an HVAC fan-on setting is detected, then the method goes to step 118. At step 118, the method checks if the HVAC fan-on time is greater than (>) the fan-on delay. If step 118 is No (N), the method loops back to step 115 to monitor the HVAC fan-on duration. If the fan-on time delay is not selected by the user (default is 0.5 to 60 minutes), then step 118 will go to step 119. If step 118 is Yes (Y), the method goes to step 119. At step 119, the method detects whether the building is occupied based on an occupancy sensor signal from an occupancy sensor configured to determine an occupancy in a conditioned space served by the HVAC system. If step 119 is Yes (Y), the method goes to step 121.

At step 121, the method provides an alarm message to report the HVAC fan-on continuously or hourly (depending on the HVAC fan-on time monitored at step 115). At step 121, the alarm message provides at least one option to reduce, modify, or change a time (duration) or a frequency of the at least one fan-on time or duration control to save energy. After step 121, the method goes to step 123 where the user is notified to set or modify the fan on time or frequency. If the user selects the at least one option to reduce, modify, or change the time or the frequency of the at least one fan-on duration control, then step 123 is Yes (Y), and then the method goes to step 137 or step 139 depending on the user selection. If the user changes the fan-on duration control to an auto setting at step 123, then the method goes to step 137 to control an economizer damper position and/or operate the HVAC fan based only on the thermostat call for cooling or heating. The method of controlling the economizer damper position may comprise closing an economizer damper to reduce the outdoor airflow when the building is unoccupied or partially closing the economizer damper when the building is partially occupied. The method of controlling the economizer damper position may also comprise partially or fully opening the economizer damper to increase the outdoor airflow during a thermostat call for cooling when the building is unoccupied and the outdoor air temperature is less than the cooling setpoint temperature to help satisfy the thermostat call for cooling and save energy (e.g., mechanical cooling). If the user selects reduce or modify the time and/or frequency at step 123, then the method goes to step 139 to operate the HVAC fan for less time and/or frequency. If step 123 is No (N), the method proceeds to step 125 to check the thermostat call for cooling. If step 125 is Yes (Y), the method goes to step 127 to energize the cooling system until the thermostat call for cooling is satisfied at step 125. If step 125 is No (N), the method goes to step 129 to check the thermostat call for heating. At step 129, if the thermostat call for heating is Yes (Y), the method goes to step 131 to energize the heating system until the thermostat call for heating is satisfied at step 129. If step 129 is No (N), the method goes back to step 115 and continues to loop back until step 117 is Yes (Y). If step 117 is No (N), the method goes to step 125. If step 117 is Yes (Y), the method goes to step 118.

If step 119 is No (N), the building is not occupied based on the occupancy sensor signal, then the method goes to step 133 and provides an optional alarm message to report the HVAC fan-on continuously or hourly (depending on HVAC fan-on time monitored at step 115). The step 133 alarm message may also provide at least one option to reduce, modify, or change the time or frequency of the at least one fan-on time or duration control to save energy. At step 134, the method provides an OFC fan-off time delay based on the occupancy sensor signal. The OFC fan-off delay starts when the occupancy sensor detects no occupancy and continues for 10 to 60 minutes based on a user input of a default value.

In an embodiment, the OFC fan-off time delay may be set to a few seconds for testing operation of the OFC by an installer. At step 135, the method determines whether to override the HVAC fan-on based on the occupancy sensor signal or the OFC fan-off delay (or user response to change the time or frequency at step 133). Step 135 may also check if the HVAC fan-on time (monitored in step 115) is greater than a Threshold Fan-on Time (TFT). The TFT may vary based on user input or a default value of 30 seconds to 60 minutes. If step 135 is No (N), then the method does not override the HVAC fan-on setting at step 135, then the method goes back to step 115 and continues monitoring the HVAC fan-on time. If step 135 is Yes (Y), then the method overrides the HVAC fan-on setting based on the occupancy sensor signal at step 119 and the OFC fan-off delay at step 134, and the method goes to step 137 or step 139.

At step 137, the OFC method comprises overriding an economizer controller to control an economizer damper to adjust or reduce outdoor airflow and save energy during a fan-only operation or a thermostat call for cooling or heating when the conditioned space is unoccupied. The OFC method may also reduce fan speed and deliver less airflow and partially close the economizer damper when the conditioned space is partially occupied at less than 100% of the design occupancy or the peak occupancy to save energy. At step 137, the method may also allow the economizer damper to fully open for economizer cooling when the outdoor air temperature is lower than the thermostat setpoint and the building is unoccupied to reduce mechanical compressor-based cooling. At step 137, the method also comprises automatically overriding the at least one HVAC fan-on duration control selected by a user when a space served by the HVAC system is unoccupied based on the occupancy sensor signal. The overriding may comprise an auto setting operating the HVAC fan based only on a thermostat call for cooling or a thermostat call for heating.

After step 137, the method goes to step 138 to check if P3 equals 1, indicating a heating cycle occurred when unoccupied. If step 138 is Yes (Y) and P3 equals 1, the method goes to step 142 to provide a variable fan-off delay based on the heating cycle duration. After step 142, the method goes to step 141 to check if the building is occupied. If step 138 is No (N) and P3 equals zero, the method goes to step 140. At step 140 the method checks if P4 equals zero, indicating a cooling cycle occurred when unoccupied. If step 140 is Yes (Y) and P4 equals 1, the method goes to step 144 to provide a variable fan-off delay based on the cooling cycle duration. After step 144, the method goes to step 141 to check if the building is occupied.

At step 141, the method detects whether the building is occupied. If step 141 is Yes (Y), the building is occupied, then the method goes back to step 125 to check the thermostat call for cooling and continues (with building occupied). If step 141 is No (N), the building is unoccupied based on the occupancy sensor signal, then the method goes to step 145 to check for a thermostat call for cooling. At step 145, if the thermostat call for cooling is Yes (Y), the method goes to step 147 to energize the cooling system (with the HVAC fan) until the thermostat call for cooling is satisfied at step 145 and goes to step 148 to set P4 equal to 1. If step 145 is No (N), the method goes to step 149. At step 149, if the thermostat call for heating is Yes (Y), the method goes to step 151 to energize the heating system (with the HVAC fan) until the thermostat call for heating is satisfied at step 149 and goes to step 152 to set P3 equal to 1. If step 149 is No (N), the method goes back to step 137 and continues overriding the HVAC fan-on setting and continues to step 138 through step 144 to provide variable fan-off delays based on heating or cooling cycle durations and to step 141 to check if the building is unoccupied. If step 141 is No (N) (the building is not occupied), then the method continues.

In an embodiment, step 137 may comprise controlling an economizer damper position in order to adjust an outdoor airflow. As described hereinabove, controlling an economizer damper position in order to adjust the outdoor airflow may comprise: closing the economizer damper and operating the HVAC fan based on a thermostat call for heating or cooling, opening the economizer damper, and/or modulating the economizer damper between an open and closed position. The OFC method may control the economizer damper position based on a variety of factors, including occupancy, indoor/outdoor air quality and temperature, and time, At step 139, the method comprises automatically overriding the at least one fan-on duration and operating the HVAC fan for less time and/or less frequency than the at least one fan-on duration control selected by the user. This may comprise reducing a duration or a frequency of the at least one fan-on duration control setting to save energy and maintain a minimum outdoor airflow or air filtration to meet an indoor air quality requirement. The overriding may also include operating the HVAC fan based on the thermostat call for cooling or heating plus time for ventilation or air filtration, but less time than the at least one fan-on duration control selected by the user to save energy. After step 139, the method goes to step 143 and detects whether the building is occupied. If step 143 is No (N), the building is unoccupied based on the occupancy sensor signal, then the method goes back to step 139 and continues to operate the HVAC fan for less time or less frequency than the at least one fan-on duration control selected by the user. If step 143 is Yes (Y), and the building is occupied, then the method goes back to step 125 to check the thermostat call for cooling and continues. If step 143 is Yes (Y), the at least one fan-on duration control is resumed with the HVAC fan-on setting when the occupancy sensor indicates the conditioned space is occupied.

The Heating, Ventilating, Air Conditioning (HVAC) fan control method comprises detecting an HVAC fan is controlled by at least one fan-on duration control selected by a user with a user interface (UI) where the at least one fan-on duration control operates the HVAC fan to recirculate air in a conditioned space for the at least one fan-on duration. The method may comprise performing at least one action selected from the group consisting of: notifying the user to select a fan-on time delay and waiting until after a fan-on time delay selected by the user and providing at least one fan-on alarm message prior to overriding the at least one fan-on duration control, monitoring an occupancy sensor signal from an occupancy sensor configured to determine an occupancy in a conditioned space served by an HVAC system and waiting until after a fan-off delay selected by the user (or a default fan-off delay in the OFC method, thermostat, energy management system, or HVAC system), and automatically overriding the at least one fan-on duration control to save energy when the conditioned space is unoccupied based on the occupancy sensor signal wherein the overriding comprises at least one method selected from the group consisting of: operating the HVAC fan in an auto mode based on a thermostat call for cooling or a thermostat call for heating, closing an economizer damper to reduce outdoor airflow when the conditioned space is unoccupied, providing variable fan-off delays based on cooling or heating cycle durations when the conditioned space is unoccupied, operating the HVAC fan for a non-zero time less than the at least one fan-on duration control selected by the user, and operating the HVAC fan for a non-zero frequency less than the at least one fan-on duration control selected by the user.

The method may comprise notifying the user to select the fan-on time delay further including the user selecting the fan-on time delay or the fan-on time delay is set to (or otherwise may remain) a default value, wherein the default value is based on the fan-on duration control or the TFT.

The frequency may comprise a number of intermittent or periodic cycles of the at least one fan-on duration control selected by the user. For example, some smart thermostats provide a circulate feature where a user can select a fan-on duration control for a percentage of time, and the smart thermostat will operate the fan for a fraction of the fan-on duration and two to four intermittent or periodic cycles. For example, when a user selects circulate 35%, the smart thermostat may provide about 20 minutes of fan-on time per hour with two ten-minute periods, minus time the fan operates with the heating or cooling system. Another smart thermostat provides a fan-on duration control to operate the fan for two durations and two intermittent or periodic cycles per hour if the user selects a fan-on duration of less than 20 minutes. If the user selects a fan-on duration control of 20 minutes or greater, then the smart thermostat provides a fan-on duration control to operate the fan for four durations and four intermittent or periodic cycles per hour. The durations may not be equal, and the intermittent cycles may not occur at equal intervals. Furthermore, if the heating or cooling cycle operates within any hour, the length of either cycle will be deducted from the Fan Min On Time. For example, if cooling runs for 5 minutes and Fan Min On Time is set to 20 minutes, 5 minutes will be deducted from the Fan Min On Time, but the total fan-on duration will not be reduced. The OFC method may reduce the duration and/or the frequency of the Fan Min On Time or the circulate fan-on duration or the hourly or scheduled fan-on duration to save energy based on an occupancy sensor signal.

Providing the at least one fan-on alarm message prior to overriding the at least one fan-on duration control comprises a message providing available options to reduce, modify, or change a duration or a frequency of the at least one fan-on duration control to save energy. The available options may comprise changing the at least one fan-on duration control to an auto setting to operate the HVAC fan based on a thermostat call for cooling or a thermostat call for heating to save energy. Providing the at least one fan-on alarm message comprises at least one communication method selected from the group consisting of: a message displayed on a smart thermostat or a software application, a text message, an email message, and an audio communication.

The User Interface (UI) comprises at least one UI selected from the group consisting of: a mechanical switch, a Graphical User Interface (GUI), a touch user interface, a Voice User Interface (VUI), a Command Line Interface (CLI), a menu-driven user interface, a form-based user interface, a natural language user interface, an Artificial Intelligence (AI) software program. The UI also comprises at least one control system selected from the group consisting of: a smart thermostat software application, a mobile device software application, a voice assistant software agent, a cloud-based software control program, a computer software program, and an Energy Management System (EMS).

The method overrides the at least one fan-on setting selected by the user to save energy while the space served by an HVAC system is unoccupied based on the occupancy sensor signal from an occupancy sensor configured to determine an occupancy in a conditioned space served by the HVAC system. The method may also modify the fan-on duration setting selected by the user to maintain a minimum outdoor airflow, a circulation for air filtration, or an indoor air quality. When the occupancy sensor indicates the conditioned space served by the HVAC system is occupied, the method may include operating the HVAC fan for a fan-off delay after the thermostat call for cooling or heating wherein the fan-off delay is based on a duration of the thermostat call for cooling or heating. The at least one fan-on duration control selected by the user is resumed when the occupancy sensor indicates the conditioned space is occupied. The user may select the fan-off delay, or the method may allow the fan-off delay to remain a default value, wherein the default value is based on the at least one fan-on duration control.

Modifying or overriding the fan-on setting comprises at least one action selected from the group consisting of: waiting for a fan-off delay, turning off the HVAC fan, turning off the HVAC fan for a variable or a fixed time period, skipping a fan-on schedule and not turning on the HVAC fan, turning off the HVAC fan for a fraction of a fan-on setting duration or a fan-on schedule duration, modifying the fan-on setting based on an occupancy sensor signal.

Providing the at least one fan-on alarm message comprises at least one communication selected from the group consisting of: a message displayed on a smart thermostat or a software application, a text message, and an audio communication. The at least one fan-on alarm message may be selected from the group consisting of: the HVAC fan is on, select "Eco" mode to reduce fan-on operation by 20% or more (select %), the HVAC fan has been on for a monitored length of time, selecting a continuous fan-on setting will increase energy use or CO2 emissions, select "auto" to set the fan to operate based only on a thermostat call for cooling or heating, select "modify" to reduce the duration or frequency of the fan-on duration to save energy, select "Eco" mode to reduce fan-on operation by 20% or more (select %).

The HVAC fan control method comprises detecting a HVAC fan is controlled by a fan-on setting, determining a space served by the HVAC system is unoccupied based on an occupancy sensor signal, and modifying the fan-on setting based on the occupancy sensor signal. The method further includes at least one action selected from the group consisting of: providing a fan-on alarm message, determining an HVAC fan-on duration is greater than a Threshold Fan-on Time (TFT) or a fan-on time delay, modifying the fan-on setting based on the TFT, waiting for a fan-off delay, and overriding the fan-on setting to an auto setting where the auto setting only operates the fan during a thermostat call for cooling or heating. The TFT may range from 0 to 60 minutes.

The method of overriding the HVAC fan-on duration control may comprise controlling an economizer damper position in order to adjust an outdoor airflow or simply de-energizing an occupancy signal to an economizer controller to de-energize an actuator and close an economizer damper to reduce outdoor airflow and save energy during thermostat calls for cooling or heating when the conditioned space is unoccupied. The method of overriding may comprise waiting for a fan-off time delay selected by the user or a default fan-off time delay. The fan-off time delay selected by the user may vary from a few seconds to 60 minutes or longer.

The method of controlling the economizer damper position may comprise closing an economizer damper to reduce the outdoor airflow when the building is unoccupied. The method of controlling the economizer damper position may also comprise fully opening the economizer damper to increase the outdoor airflow during a thermostat call for cooling when the building is unoccupied and the outdoor air temperature is less than the cooling setpoint temperature to help satisfy the thermostat call for cooling and save energy.

While the OFC method herein disclosed has been described by means of specific embodiments and applications thereof, numerous modifications and variations could be made thereto by those skilled in the art without departing from the scope of the OFC method set forth in the claims.

The invention claimed is:

1. A Heating, Ventilating, Air Conditioning (HVAC) fan control method, the method comprising:
   detecting an HVAC fan is controlled by at least one fan-on duration control selected by a user with a User Interface (UI);
   wherein the at least one fan-on duration control operates the HVAC fan to recirculate air in a conditioned space for the at least one fan-on duration; and
   monitoring an occupancy sensor signal from an occupancy sensor configured to determine an occupancy in the conditioned space served by an HVAC system and waiting until after a fan-off delay and automatically overriding the at least one fan-on duration control to save energy when the conditioned space is unoccupied based on the occupancy sensor signal, wherein the overriding comprises at least one method selected from the group consisting of:
      operating the HVAC fan in auto mode based on a thermostat call for cooling or the thermostat call for heating; and
      controlling an economizer damper position in order to adjust an outdoor airflow.

2. The method of claim 1, wherein controlling the economizer damper position comprises closing an economizer damper to reduce the outdoor airflow when a building is unoccupied.

3. The method of claim 1, wherein controlling the economizer damper position comprises fully opening the economizer damper to increase the outdoor airflow during the thermostat call for cooling when a building is unoccupied and an outdoor air temperature is less than a cooling setpoint temperature to help satisfy the thermostat call for cooling and save energy.

4. The method of claim 1, further comprising allowing the user to select the fan-off delay or allowing the fan-off delay to remain a default value, wherein the default value is based on the at least one fan-on duration control.

5. The method of claim 1, wherein the UI comprises at least one UI selected from the group consisting of: a mechanical switch, a graphical user interface (GUI), a touch user interface, a voice user interface (VUI), a command line interface (CLI), a menu-driven user interface, a form-based user interface, a natural language user interface, and an Artificial Intelligence (AI) software program.

6. The method of claim 1, wherein the UI comprises at least one control system selected from the group consisting of: a smart thermostat software application, a mobile device software application, a voice assistant software agent, a cloud-based software control program, a computer software program, an Artificial Intelligence (AI) software program and an Energy Management System.

7. The method of claim 1, wherein the at least one fan-on duration control is resumed when the occupancy sensor indicates the conditioned space is occupied.

8. The method of claim 1, wherein automatically overriding the at least one fan-on duration control comprises waiting for the fan-off delay selected by the user or a default fan-off delay.

9. The method of claim 8, wherein the fan-off delay selected by the user varies from a few seconds to 60 minutes.

10. A Heating, Ventilating, Air Conditioning (HVAC) fan control method, the method comprising:
    detecting an HVAC fan is controlled by at least one fan-on duration control selected by a user with a User Interface (UI);
    wherein the at least one fan-on duration control operates the HVAC fan to recirculate air in a conditioned space for the at least one fan-on duration after a fan-off delay and automatically overriding the at least one fan-on duration control to save energy when the conditioned space is unoccupied and operating the HVAC fan in auto mode based only on a thermostat call for cooling or the thermostat call for heating.

11. The method of claim 10, further comprising allowing the user to select the fan-off delay or allowing the fan-off delay to remain a default value, wherein the default value is based on the fan-on duration control.

12. The method of claim 10, wherein the UI comprises at least one UI selected from the group consisting of: a mechanical switch, a graphical user interface (GUI), a touch user interface, a voice user interface (VUI), a command line interface (CLI), a menu-driven user interface, a form-based user interface, a natural language user interface, and an Artificial Intelligence (AI) software program.

13. The method of claim 10, wherein the UI comprises at least one control system selected from the group consisting of: a smart thermostat software application, a mobile device software application, a voice assistant software agent, a cloud-based software control program, a computer software program, an Artificial Intelligence (AI) software program, and an Energy Management System.

14. The method of claim 10, wherein the at least one fan-on duration control is resumed when the conditioned space is occupied.

15. The method of claim 10, wherein automatically overriding the at least one fan-on duration control comprises waiting for the fan-off delay selected by the user or a default fan-off delay.

16. The method of claim 15, wherein the fan-off delay selected by the user varies from a few seconds to 60 minutes.

17. A Heating, Ventilating, Air Conditioning (HVAC) fan control method, the method comprising:
    detecting an HVAC fan is controlled by at least one fan-on duration control selected by a user with a User Interface (UI);
    wherein the at least one fan-on duration control operates the HVAC fan to recirculate air in a conditioned space for the at least one fan-on duration;
    monitoring an occupancy sensor signal from an occupancy sensor configured to determine an occupancy in the conditioned space served by an HVAC system;
    waiting until after a fan-off delay; and
    performing at least one action selected from the group consisting of:
       automatically overriding the at least one fan-on duration control to save energy when the conditioned space is unoccupied based on the occupancy sensor signal;
       operating the HVAC fan in auto mode based on a thermostat call for cooling or the thermostat call for heating; and controlling an economizer damper position in order to adjust an outdoor airflow.

18. The method of claim 17, wherein controlling the economizer damper position comprises closing an economizer damper to reduce the outdoor airflow when a building is unoccupied.

19. The method of claim 17, wherein controlling the economizer damper position comprises fully opening the economizer damper to increase the outdoor airflow during the thermostat call for cooling when a building is unoccupied and an outdoor air temperature is less than a cooling setpoint temperature to help satisfy the thermostat call for cooling and save energy.

20. The method of claim 17, further comprising allowing the user to select the fan-off delay or allowing the fan-off delay to remain a default value, wherein the default value is based on the fan-on duration control.

21. The method of claim 17, wherein the UI comprises at least one UI selected from the group consisting of: a mechanical switch, a graphical user interface (GUI), a touch user interface, a voice user interface (VUI), a command line interface (CLI), a menu-driven user interface, a form-based user interface, a natural language user interface, and an Artificial Intelligence (AI) software program.

22. The method of claim 17, wherein the UI comprises at least one control system selected from the group consisting of: a smart thermostat software application, a mobile device software application, a voice assistant software agent, a cloud-based software control program, a computer software program, an Artificial Intelligence (AI) software program, and an Energy Management System.

23. The method of claim 17, wherein the at least one fan-on duration control is resumed when the occupancy sensor indicates the conditioned space is occupied.

* * * * *